US008132025B2

(12) United States Patent  
Tanaka et al.

(10) Patent No.: US 8,132,025 B2  
(45) Date of Patent: Mar. 6, 2012

(54) MANAGEMENT METHOD FOR ARCHIVE SYSTEM SECURITY

(75) Inventors: Toru Tanaka, Kawasaki (JP); Yuichi Taguchi, Sagamihara (JP); Masayuki Yamamoto, Sagamihara (JP); Jun Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1031 days.

(21) Appl. No.: 12/017,361

(22) Filed: Jan. 22, 2008

(65) Prior Publication Data

US 2009/0063872 A1 Mar. 5, 2009

(30) Foreign Application Priority Data

Sep. 4, 2007 (JP) .................................. 2007-228702

(51) Int. Cl.  
*G06F 11/30* (2006.01)

(52) U.S. Cl. .......... 713/193; 711/112; 711/173; 380/59; 726/2; 726/26

(58) Field of Classification Search .................. 713/193; 380/59; 711/63, 112, 173; 726/2, 26  
See application file for complete search history.

(56) References Cited

U.S. PATENT DOCUMENTS

| 5,841,865 | A * | 11/1998 | Sudia ............................ 380/286 |
| 5,995,623 | A * | 11/1999 | Kawano et al. ............... 713/189 |
| 6,708,183 | B1 * | 3/2004 | Mori et al. ............................ 1/1 |
| 6,981,140 | B1 * | 12/2005 | Choo ............................ 713/164 |
| 7,086,087 | B1 * | 8/2006 | Kaminaga et al. .............. 726/16 |
| 7,185,208 | B2 * | 2/2007 | Gorobets ....................... 713/193 |
| 7,584,198 | B2 * | 9/2009 | Slade ................................... 1/1 |
| 7,693,877 | B1 * | 4/2010 | Zasman ........................ 707/707 |
| 2001/0050990 | A1 * | 12/2001 | Sudia ............................ 380/286 |
| 2002/0032772 | A1 | 3/2002 | Olstad et al. |
| 2002/0046320 | A1 * | 4/2002 | Shaath ........................ 711/112 |
| 2003/0105967 | A1 * | 6/2003 | Nam ............................. 713/189 |
| 2004/0025034 | A1 * | 2/2004 | Alessi et al. .................. 713/189 |
| 2004/0172538 | A1 * | 9/2004 | Satoh et al. ................... 713/175 |
| 2005/0175173 | A1 * | 8/2005 | Nakamura et al. .............. 380/28 |
| 2005/0234847 | A1 * | 10/2005 | Damien et al. .................... 707/1 |
| 2006/0227123 | A1 * | 10/2006 | Bychkov et al. .............. 345/204 |
| 2006/0259432 | A1 * | 11/2006 | Ishibashi et al. ................ 705/52 |

(Continued)

FOREIGN PATENT DOCUMENTS

JP 2004-509415 3/2004

*Primary Examiner* — April Shan  
(74) *Attorney, Agent, or Firm* — Antonelli, Terry, Stout & Kraus, LLP.

(57) ABSTRACT

Creating a plaintext index from a text that is extracted from a file presents the risk of a leak of confidential information from the created index. To address this problem, provided is a computer system which has a computer, a storage subsystem coupled to the computer, and a network coupling the computer and the storage subsystem. The computer has an interface coupled to the network, a first processor coupled to the interface, and a memory coupled to the first processor. The storage subsystem has a disk device which stores data. A storage area of the disk device is divided into a plurality of storage areas including, at least, a first storage area and a second storage area. The first processor reads a part of data stored in the first storage area, encrypts the part of data read from the first storage area when the data stored in the first storage area is judged as encrypted data, and writes the encrypted part of data in the second storage area.

18 Claims, 12 Drawing Sheets

U.S. PATENT DOCUMENTS

| | | | |
|---|---|---|---|
| 2007/0180270 A1* | 8/2007 | Kumagai et al. | 713/193 |
| 2007/0186287 A1* | 8/2007 | Slade | 726/27 |
| 2007/0204335 A1* | 8/2007 | Zugenmaier et al. | 726/9 |
| 2007/0266242 A1* | 11/2007 | Yamaguchi | 713/164 |
| 2008/0141042 A1* | 6/2008 | Lo | 713/193 |
| 2008/0208871 A1* | 8/2008 | Ishibashi | 707/10 |

* cited by examiner

| | 5001 | 5002 | 5003 | 5004 | 5005 | 2005 |
|---|---|---|---|---|---|---|
| | HOST NAME | EMPLOYED LU | USE | CONNECTED IF | INDEX LOCATION | |
| | 1000 | 1410 | FILE | 1401 | 1412 | |
| | 1000 | 1411 | FILE | 1401 | 1412 | |
| | 1000 | 1412 | INDEX | 1401 | | |

*FIG. 5*

| 6001 | 6002 | 6003 | 6004 | 2006 |
|---|---|---|---|---|
| FILE NAME | FILE-STORING STORAGE NAME | FILE-STORING LU NAME | ENCRYPTION | |
| 1413 | 1400 | 1410 | OFF | |
| 1414 | 1400 | 1411 | 256 | |
| 1415 | 1400 | 1412 | OFF | |

*FIG. 6*

MANAGEMENT METHOD FOR ARCHIVE SYSTEM SECURITY

CLAIM OF PRIORITY

The present application claims priority from Japanese patent application JP 2007-228702 filed on Sep. 4, 2007, the content of which is hereby incorporated by reference into this application.

BACKGROUND

This invention relates to a technique of archiving in a storage system, and more particularly, to a technique of enhancing the security and performance of a storage subsystem.

The recent improvements in computer performance and Internet line speed have caused an increase in amount of data handled by a computer. There is also a growing expectation for archive systems which keep files in storage subsystems for a long period of time as a way to meet legal regulations or as a preparation for possible lawsuits.

JP 2004-509415 A discloses a technique of improving the file retrieval speed by indexing files based on the files' attribute information or the like, and thus speeding up access to stored files.

The technique disclosed in JP 2004-509415 A creates an index containing an update time, or a rank for determining in what order documents are to be displayed, and a text extracted from a search object file. In the case where a search object file contains confidential information such as a customer name, the search object file is encrypted and the encrypted search object file is stored in a storage subsystem. However, encrypting a search object file does not eliminate the risk of a leak of confidential information since a text extracted from the search object file is used to create a plaintext index and confidential information could be obtained from the created index.

A leak of information from an index can be prevented by encrypting the created index before storing the index.

SUMMARY

A representative aspect of this invention is as follows. That is, there is provided a computer system, comprising: a computer; a storage subsystem coupled to the computer; and a network through which the computer and the storage subsystem are coupled. The computer comprises an interface coupled to the network, a first processor coupled to the interface, and a memory coupled to the first processor. The storage subsystem comprises a disk device, which stores data, and a second processor which controls the disk device. The disk device provide a plurality of storage areas, the divided plurality of storage areas including, at least, a first storage area and a second storage area. The first processor is configured to: read a part of data stored in the first storage area; judge whether or not the data stored in the first storage area is encrypted data; encrypt the part of data read from the first storage area when it is judged that the data stored in the first storage area is encrypted data; and write the encrypted part of data into the second storage area.

According to a mode of carrying out this invention, a leak of confidential information can be prevented by encrypting a created index before storing the index.

BRIEF DESCRIPTION OF THE DRAWINGS

The present invention can be appreciated by the description which follows in conjunction with the following figures, wherein:

FIG. 5 is an explanatory diagram showing a configuration of a search computer setting table in accordance with the first embodiment of this invention;

FIG. 6 is an explanatory diagram showing a configuration of a file management table in accordance with the first embodiment of this invention;

DETAILED DESCRIPTION OF THE PREFERRED EMBODIMENTS

Embodiments of this invention will be described below with reference to the accompanying drawings.

First Embodiment

A computer system according to a first embodiment of this invention will be described first.

In the first embodiment, a search computer creates an index (described later) of a file stored in a storage subsystem.

Figure 1:
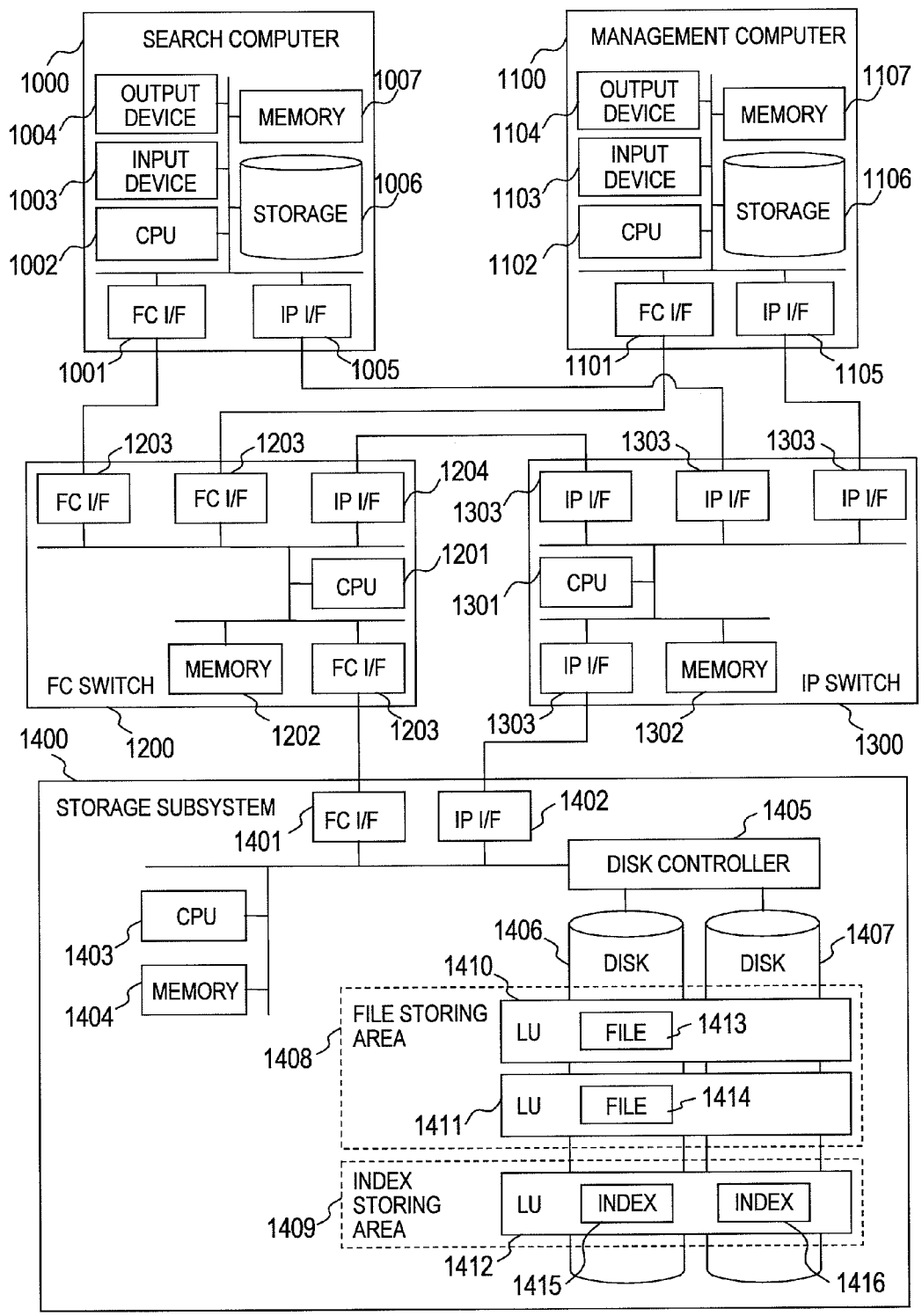
FIG. 1 is a block diagram showing a configuration of a computer system in accordance with a first embodiment of this invention.

FIG. 1 is a block diagram showing a configuration of the computer system according to the first embodiment of this invention.

The computer system has a search computer 1000, a management computer 1100, an FC switch 1200, an IP switch 1300, and a storage subsystem 1400.

The search computer 1000 is a computer that inputs and outputs data to and from the storage subsystem 1400. The search computer 1000 has an FC I/F 1001, a CPU 1002, an input device 1003, an output device 1004, an IP I/F 1005, storage 1006, and a memory 1007.

The FC I/F 1001 exchanges input/output data with the storage subsystem 1400 via the FC switch 1200.

The CPU 1002 is a processor that executes a program stored in the memory 1007 and thus exerts overall control of the search computer 1000.

The input device 1003 is a device for receiving an input of information from a user. The input device 1003 may include, for example, a keyboard and/or a mouse.

The output device 1004 is a device for displaying information to a user. The output device 1004 may include, for example, a display device such as a liquid crystal display device, or a printer.

The IP I/F 1005 exchanges management data with the management computer 1100 via the IP switch 1300.

The storage 1006 stores a program, user data, or the like. The storage 1006 may be, for example, a hard disk drive (HDD).

The memory 1007 stores a program executed by the CPU 1002. The memory 1007 may be, for example, a semiconductor memory such as a Random Access Memory (RAM). At least a part of a program stored in the storage 1006 may be copied to the memory 1007 when necessary.

The management computer 1100 is a computer that manages the search computer 1000 and the storage subsystem 1400. The management computer 1100 has an FC I/F 1101, a CPU 1102, an input device 1103, an output device 1104, an IP I/F 1105, storage 1106, and a memory 1107.

The FC I/F 1101 exchanges input/output data and control data with the storage subsystem 1400 via the FC switch 1200.

The CPU 1102 is a processor that executes a program stored in the memory 1107 and thus exerts overall control of the management computer 1100.

The input device 1103 is a device for receiving an input of information from a user. The input device 1103 may include, for example, a keyboard and/or a mouse.

The output device 1104 is a device for displaying information to a user. The output device 1104 may include, for example, a display device such as a liquid crystal display device, or a printer.

The IP I/F 1105 exchanges management data with the search computer 1000 or the storage subsystem 1400 via the IP switch 1300.

The storage 1106 stores a program and/or user data and the like. The storage 1106 may be, for example, a hard disk drive (HDD).

The memory 1107 stores a program executed by the CPU 1102. The memory 1107 may be, for example, a semiconductor memory such as a Random Access Memory (RAM). At least a part of a program stored in the storage 1106 may be copied to the memory 1107 when necessary.

The FC switch 1200 is a switch device that transfers input/output data between the search computer 1000 and the storage subsystem 1400. The FC switch 1200 has a CPU 1201, a memory 1202, an FC I/F 1203, and an IP I/F 1204.

The CPU 1201 is a processor that executes a program stored in the memory 1202 and thus exerts overall control of the FC switch 1200.

The memory 1202 stores a program executed by the CPU 1201 and/or data. The memory 1202 may be, for example, a semiconductor memory such as a RAM. The FC I/F 1203 sends and receives input/output data. The IP I/F 1204 sends and receives management data. The FC switch 1200, which, in FIG. 1, contains three FC I/Fs 1203, can have an arbitrary number of FC I/Fs 1203.

The IP switch 1300 is a switch device that transfers management data from the management computer 1100 to the search computer 1000 and others. The IP switch 1300 has a CPU 1301, a memory 1302, and an IP I/F 1303.

The CPU 1301 is a processor that executes a program stored in the memory 1302 and thus exerts overall control of the IP switch 1300. The memory 1302 stores a program and/or data. The IP I/F 1303 sends and receives management data. The IP switch 1300, which, in FIG. 1, contains four IP I/Fs 1303, can have an arbitrary number of IP I/Fs 1303.

The storage subsystem 1400 is a node that processes input/output data sent and received by the search computer 1000. The storage subsystem 1400 has an FC I/F 1401, an IP I/F 1402, a CPU 1403, a memory 1404, a disk controller 1405, a disk device 1406, and a disk device 1407.

The FC I/F 1401 receives input/output data transferred by the FC switch 1200.

The IP I/F 1402 receives management data from the management computer 1100 via the IP switch 1300.

The CPU 1403 is a processor that executes a program stored in the memory 1404 and thus exerts overall control of the storage subsystem 1400. The memory 1404 stores a program executed by the CPU 1403.

The disk devices 1406 and 1407 keep user data. Each of the disk devices 1406 and 1407 may be, for example, a hard disk drive (HDD) or semiconductor storage such as a flash memory. FIG. 1 shows as an example two disk devices, i.e., the disk devices 1406 and 1407, but the storage subsystem 1400 can have as many disk devices as necessary (the disk devices 1406, 1407 . . . ). A plurality of disk devices 1406, 1407 . . . may constitute Redundant Arrays of Inexpensive Disks (RAID).

The user data is data that is written by a computer connected to the FC switch 1200 (for example, a not-shown client computer). The user data may be document data that is created by an application program (not shown) run in the client computer, or other similar data.

The storage areas of the disk devices 1406 and 1407 are divided into a plurality of LUs (logical volumes). FIG. 1 shows LUs 1410 to 1412 as an example. The LUs 1410 to 1412 are each a storage area recognized by a host computer (e.g., the client computer or the search computer) as one logical disk device. Physical storage areas contained in the disk devices 1406 and 1407 and having arbitrary capacities are allocated to the LUs 1410 to 1412.

The storage areas of the disk devices 1406 and 1407 are partitioned into a file storing area 1408 where files containing user data are stored and an index storing area 1409 where indices used in a search are stored. In the example of FIG. 1, the LUs 1410 and 1411 belong to the file storing area 1408 whereas the LU 1412 belongs to the index storing area 1409.

The LUs 1410 and 1411 store a file denoted by the File 1413 and a file denoted by the File 1414, respectively. The Files 1413 and 1414 are files written by the client computer or others and containing user data. Each file is associated with a storage area within each LU. For instance, data contained in the File 1413 is stored in a storage area within the LU 1410 and data contained in the File 1414 is stored in a storage area within the LU 1411. The association relation between a file and a storage area where data contained in the file is stored is managed by an operating system (more specifically, a file system) of a computer (e.g., the client computer or the search computer 1000).

The LU 1412 stores an index denoted by Index 1415. The Index 1415 is a file that contains an index created from the File 1413 or other similar files.

A clarification of the term index used herein is given below.

Figure 9:
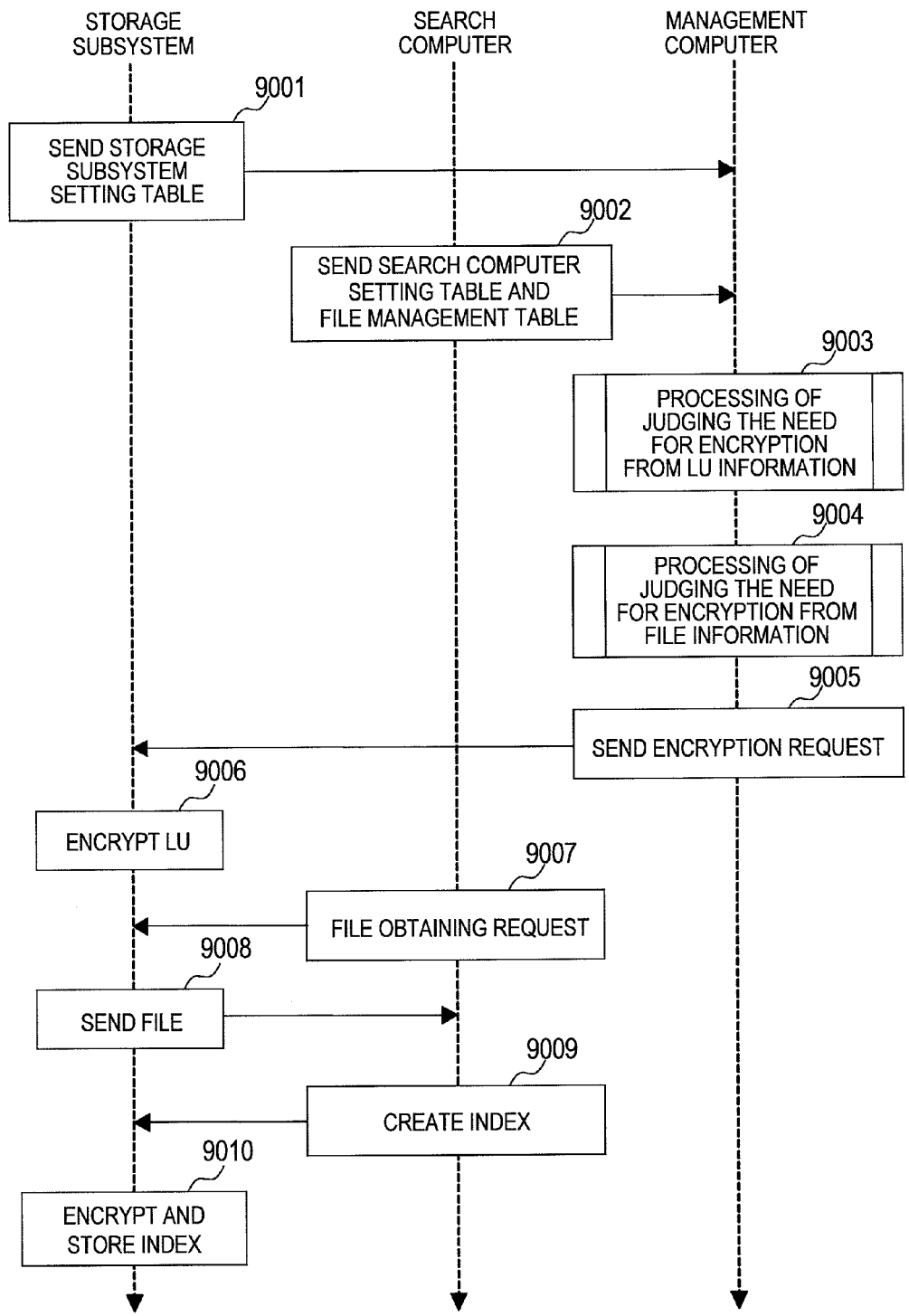
FIG. 9 is a sequence diagram showing an encryption processing in accordance with the first embodiment of this invention.

An index is information used for a quick search for the File 1413 or other similar files. For example, an index contains an update time and rank of the File 1413 or other similar files. A rank is information referred to when determining in what order search results are to be displayed. An index further contains a part of data contained in the File 1413 or other search object files. In the case where a file such as the File 1413 is a document file created by an application program of the client computer, for example, an index may contain a part of text data included in the document file. An index defined as above is created by the search computer 1000 as shown in FIG. 9 and other drawings.

The Index 1415 is thus treated as one of files. In the following description, however, the term file exclusively refers to files such as the File 1413 that are searched for with the use of indices whereas files such as the Index 1415 that contain indices are simply referred to as indices.

The LU 1412 in the first embodiment stores the Index 1415 alone, although FIG. 1 shows Index 1416 in addition to the Index 1415. The Index 1416 will be described in the second embodiment.

The LUs 1410 and 1411, which, in FIG. 1, store only Files 1413 and 1414, may store an arbitrary number of files.

In the following description, numbers attached to the components in FIG. 1 will be treated as the identifiers of the respective components. For example, the identifier of the LU 1410 is "1410".

Figure 2:
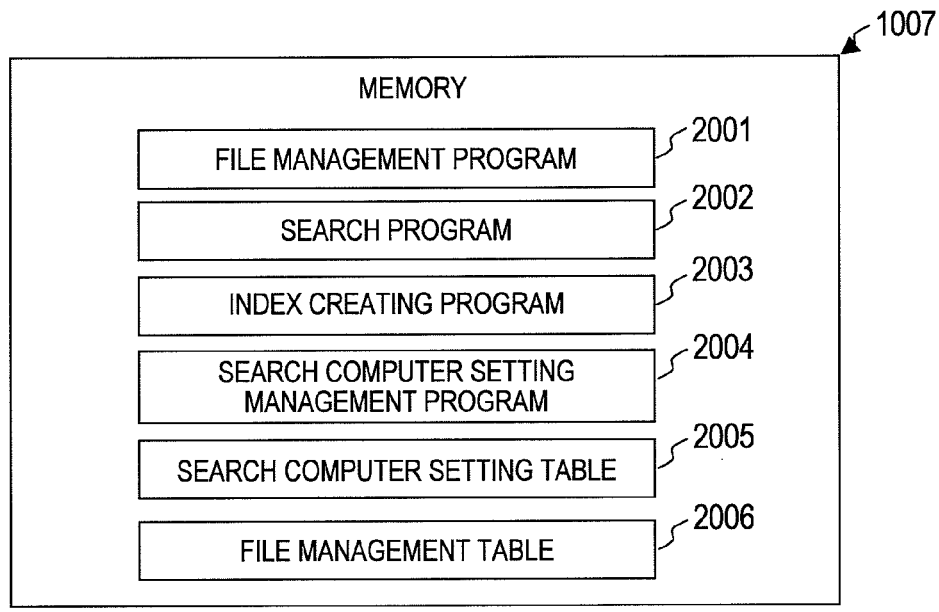
FIG. 2 is a block diagram showing a configuration of a memory of a search computer in accordance with the first embodiment of this invention.

FIG. 2 shows the configuration of the memory 1007 of the search computer 1000 according to the first embodiment of this invention.

The memory 1007 stores a file management program 2001, a search program 2002, an index creating program 2003, a search computer setting management program 2004, a search computer setting table 2005, and a file management table 2006.

The file management program 2001 provides a function of preventing a stored file from being tampered with and a function of managing the file retention term.

The search program 2002 provides a function of searching for a file with the use of an index and sending a search result to a host computer (e.g., the client computer).

The index creating program 2003 provides a function of creating an index such as a keyword for use in a file search.

The search computer setting management program 2004 manages setting information of the search computer 1000.

The search computer setting table 2005 holds setting information of the search computer 1000 as shown in FIG. 5.

The file management table 2006 holds information about the state of a file stored in an LU as shown in FIG. 6.

The search computer 1000 reads, when booted up, the file management program 2001, the search program 2002, the index creating program 2003, the search computer setting management program 2004, the search computer setting table 2005, and the file management table 2006 out of the storage 1006 onto the memory 1007 to store the read programs and tables in the memory 1007.

A file sharing protocol such as Common Internet File System (CIFS) or Network File System (NFS) may be employed to send a file to be stored from upper-layer software or a user to the file management program 2001. Also, a file to be stored may be sent with the use of a special Application Program Interface (API).

The file management program 2001, the search program 2002, and the index creating program 2003 may be stored separately in memories of different computers (for example, the search computer 1000 and the management computer 1100). In this case, these programs are executed individually by CPUs connected to the memories where the programs are stored. Alternatively, at least some of the above programs may be stored in the memory 1404 of the storage subsystem 1400. The programs stored in the memory 1404 are executed by the CPU 1403.

Figure 3:
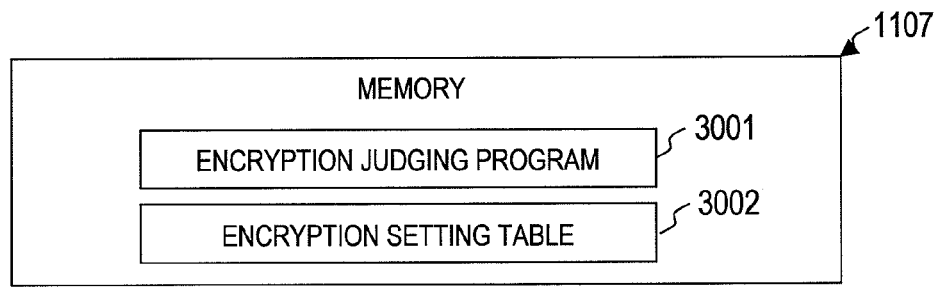
FIG. 3 is a block diagram showing a configuration of a memory of a management computer in accordance with the first embodiment of this invention.

FIG. 3 shows the configuration of the memory 1107 of the management computer 1100 according to the first embodiment of this invention.

The memory 1107 stores an encryption judging program 3001 and an encryption setting table 3002.

The encryption judging program 3001 provides a function of judging whether to encrypt an LU that stores an index.

Figure 7:
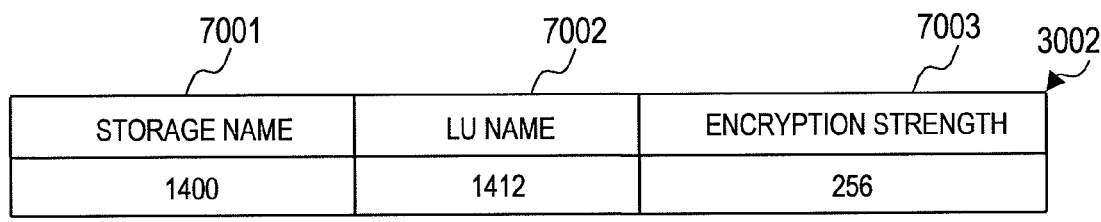
FIG. 7 is an explanatory diagram showing a configuration of the encryption setting table in accordance with the first embodiment of this invention.

The encryption setting table 3002 holds information on an LU to be encrypted as shown in FIG. 7.

The management computer 1100 reads, when booted up, the encryption judging program 3001 and the encryption setting table 3002 out of the storage 1106 onto the memory 1107 to store the read program and table in the memory 1107.

Figure 4:
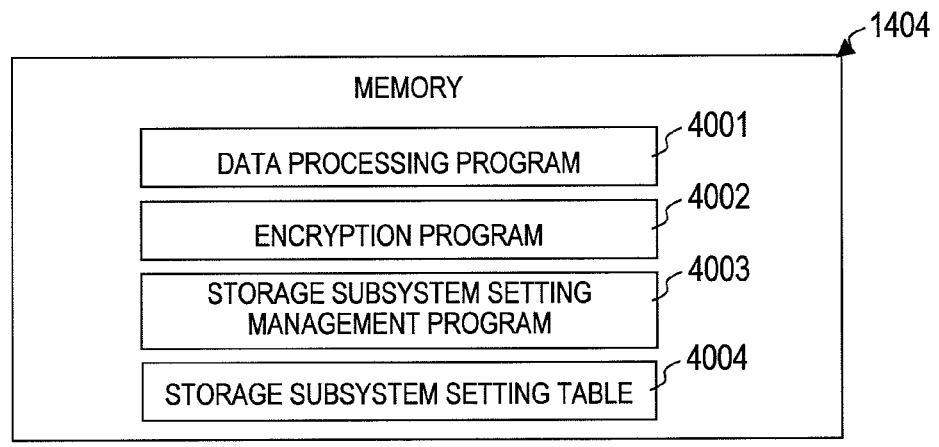
FIG. 4 is a block diagram showing a configuration of a memory of the storage subsystem in accordance with the first embodiment of this invention.

FIG. 4 shows the configuration of the memory 1404 of the storage subsystem 1400 according to the first embodiment of this invention.

The memory 1404 stores a data processing program 4001, an encryption program 4002, a storage subsystem setting management program 4003, and a storage subsystem setting table 4004.

The data processing program 4001 is executed when the storage subsystem 1400 is accessed by the search computer 1000 or others.

The encryption program 4002 provides a function of encrypting data that an LU within the storage subsystem 1400 stores.

The storage subsystem setting management program 4003 provides a function of managing setting information of the storage subsystem 1400.

The storage subsystem setting table 4004 holds setting information of the storage subsystem 1400.

The storage subsystem 1400 reads, when booted up, the data processing program 4001, the encryption program 4002, the storage subsystem setting information management program 4003, and the storage subsystem setting table 4004 out of the disk devices 1406 and 1407 onto the memory 1404 to store the read programs and table in the memory 1404.

FIG. 5 shows the configuration of the search computer setting table 2005 according to the first embodiment of this invention.

The search computer setting table 2005 contains a host name 5001, an employed LU 5002, a use 5003, a connected IF 5004, and an index location 5005.

The host name 5001 indicates the identifier of the search computer 1000.

The employed LU 5002 indicates the identifier of an LU used by the search computer 1000 which is a host.

The use 5003 indicates the use of an LU that is identified by the value of the employed LU 5002. "File" or "index" are stored as the use 5003.

When the use 5003 is "file", it means that the LU in question is used to store a file created by one of the computers (e.g., the not-shown client computer). For example, in the case where an application program run on the client computer creates a document file and the document file is stored in the LU 1410, "file" is stored as the use 5003 in an entry of the search computer setting table 2005 that holds a value "1410" as the employed LU 5002.

When the use 5003 is "index", it means that the LU in question is used to store an index created from data that is stored in another LU.

The connected IF 5004 indicates to which I/F an LU used by the search computer 1000 is connected.

The index location 5005 indicates the identifier of an LU that stores an index created from a file.

In the example of FIG. 5, "1000", "1410", "file", "1401", and "1412" are stored as the host name 5001, the employed LU 5002, the use 5003, the connected IF 5004, and the index location 5005, respectively, in the first row of the search computer setting table 2005. This means that the LU 1410 used by the search computer 1000 stores a file created by one of the computers, that the search computer 1000 can access the LU 1410 by connecting to the FC I/F 1401, and that an index created from a file within the LU 1410 is stored in the LU 1412.

FIG. 6 shows the configuration of the file management table 2006 according to the first embodiment of this invention.

The file management table 2006 contains a file name 6001, a file-storing storage name 6002, a file-storing LU name 6003, and an encryption flag 6004.

The file name 6001 indicates the identifier of a file.

The file-storing storage name 6002 indicates the identifier of the storage subsystem 1400 where the file in question is stored.

The file-storing LU name 6003 indicates an LU where the file is stored.

The encryption flag 6004 indicates whether or not the file is an encrypted file. Specifically, when the encryption flag 6004 is "OFF", it means that the file is not an encrypted file. Other values than "OFF" (for example, a numerical value such as 128 or 256) indicate that the file is an encrypted file. The numerical values "128", "256", and the like of the encryption flag 6004 indicate the encryption strength at which the file is encrypted. The encryption strength is an indicator of the degree of difficulty of deciphering encrypted data.

The length of an encryption key can be given as an example of a measure of the encryption strength. An encryption key can be as long as 128 bits, 256 bits, or longer. It is more difficult to decipher data encrypted with a 256-bit encryption key than data encrypted with a 128-bit encryption key and, accordingly, the encryption strength is greater when an encryption key has a length of 256 bits. Other measures of the encryption strength than the 128-bit or 256-bit encryption key length given as a specific example may be employed if there are any. The encryption flag 6004 is set by a host computer (e.g., the not-shown client computer) which stores a file in the storage subsystem 1400.

Data stored in an LU may be encrypted by a host computer (e.g., the not-shown client computer connected to the FC switch 1200) or by the storage subsystem 1400.

In the former case, an application program of the client computer, for example, encrypts data and sends a request to the storage subsystem 1400 to write a file containing the encrypted data. Receiving the request, the storage subsystem 1400 stores the encrypted data in an LU in accordance with the received request. When the client computer later sends a request to read the encrypted data, the storage subsystem 1400 reads the encrypted data out of the LU as requested, and sends the read data to the client computer. The storage subsystem 1400 in this case does not need to have the knowledge of whether the data is encrypted data or unencrypted data.

In the latter case, the client computer, for example, sends a request to the storage subsystem 1400 to write data, and the storage subsystem 1400 encrypts the requested data and stores the encrypted data in an LU. When the client computer later sends a request to read the encrypted data, the storage subsystem 1400 reads the encrypted data out of the LU as requested, decrypts the read data, and sends the decrypted data to the client computer. The client computer in this case does not need to be aware of the fact that the storage system 1400 has encrypted and decrypted the data.

The file management table 2006 shown in FIG. 6 is for managing whether or not data in a file is encrypted by a host computer as in the former example.

A table used to manage whether or not data is encrypted by the storage subsystem 1400 as in the latter example is the storage subsystem setting table 4004, which will be described later with reference to FIG. 8.

In the example of FIG. 6, "1414", "1400", "1411", and "256" are stored as the file name 6001, the file-storing storage name 6002, the file-storing LU name 6003, and the encryption flag 6004, respectively, in the second row of the file management table 2006. This means that the File 1414 stored in the LU 1411 of the storage subsystem 1400 has been encrypted by a host computer that has created the File 1414, and that a key used in encrypting the File 1414 has a length of 256 bits.

FIG. 7 shows the configuration of the encryption setting table 3002 according to the first embodiment of this invention.

The encryption setting table 3002 contains a storage name 7001, an LU name 7002, and encryption strength 7003.

The storage name 7001 indicates the identifier of the storage subsystem 1400 where a to-be-encrypted LU is held. A "to-be-encrypted LU" refers to an LU that stores encrypted data. Encrypted data may be, for example, an encrypted index.

The LU name 7003 indicates the identifier of a to-be-encrypted LU.

The encryption strength 7003 indicates the encryption strength at which data (e.g., an index) to be stored in an LU is encrypted. The value of the encryption strength 7003 is set based on an encryption strength value set in the file management table 2006 or the storage subsystem setting table 4004.

In the example of FIG. 7, "1400", "1412" and "256" are stored as the storage name 7001, the LU name 7002, and the encryption strength 7003, respectively, in the encryption setting table 3002. This means that an index encrypted with a 256-bit encryption key is stored in the LU 1412 of the storage subsystem 1400.

Figure 8:
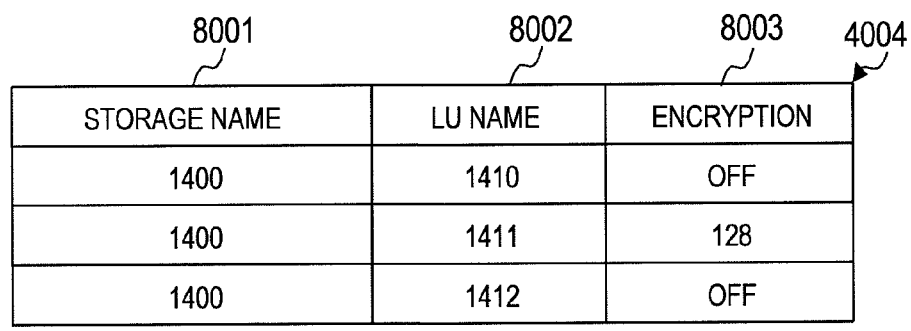
FIG. 8 is an explanatory diagram showing a configuration of the storage subsystem setting table in accordance with the first embodiment of this invention.

FIG. 8 shows the configuration of the storage subsystem setting table 4004 according to the first embodiment of this invention.

The storage subsystem setting table 4004 contains a storage name 8001, an LU name 8002, and an encryption flag 8003.

The storage name 8001 indicates the identifier of the storage subsystem 1400.

The LU name 8002 indicates the identifier of an LU.

The encryption flag 8003 indicates whether or not the LU in question has been encrypted. Specifically, when the encryption flag 8003 is "OFF", it means that the LU has not been encrypted. Other values than "OFF" (for example, a numerical value such as 128 or 256) indicate that the LU has been encrypted. The numerical values "128", "256", and the like of the encryption flag 8003 indicate the encryption strength at which the LU is encrypted. Other measures of the encryption strength than the 128-bit or 256-bit encryption key length given as a specific example may be employed if there are any. The encryption flag 8003 is set by a computer that manages the computer system (e.g., the management computer 1100).

Encryption of an LU means encryption by the storage subsystem 1400 of data stored in the LU. Specifically, when data is stored in a to-be-encrypted LU, the encryption program 4002 of the storage subsystem 1400 is executed to encrypt the data and then store the data in the LU.

In the example of FIG. 8, "1400", "1411" and "128" are stored as the storage name 8001, the LU name 8002, and the encryption flag 8003, respectively, in the second row of the storage subsystem setting table 4004. This means that data encrypted by the storage subsystem 1400 with a 128-bit encryption key is stored in the LU 1410 of the storage subsystem 1400.

FIG. 9 is a sequence diagram of encryption processing according to the first embodiment of this invention.

The premise here is that, at the time the processing of FIG. 9 is started, the search computer setting table 2005, the file management table 2006, and the storage subsystem setting table 4004 hold values shown in FIG. 5, FIG. 6, and FIG. 8, respectively, whereas there are no values recorded in the encryption setting table 3002.

First, the CPU 1403 of the storage subsystem 1400 executes the storage subsystem setting management program 4003 to send the storage subsystem setting table 4004 to the management computer 1100 (Step 9001).

The CPU 1002 of the search computer 1000 sends the search computer setting table 2005 and the file management table 2006 to the management computer 1100 (Step 9002).

The CPU 1403 and the CPU 1002 may execute Step 9001 and Step 9002 when transmission requests for the tables are received from the management computer 1100. Alternatively, the CPU 1403 and the CPU 1002 may execute Step 9001 and Step 9002 when there are changes in the tables. Step 9002 may be executed before Step 9001.

Receiving the tables from the search computer 1000 and the storage subsystem 1400, the CPU 1102 of the management computer 1100 executes processing of judging the need for encryption from LU information (encryption judging processing) (Step 9003). Details of the processing of judging the need for encryption from LU information will be described later with reference to FIG. 12.

Next, the CPU 1102 of the management computer 1100 executes processing of judging the need for encryption from file information (encryption judging processing) (Step 9004). Details of the processing of judging the need for encryption from file information will be described later with reference to FIG. 13.

The CPU 1102 of the management computer 1100 then sends to the storage subsystem 1400 an encryption request which designates an LU registered in the encryption setting table 3002 (Step 9005). Specifically, an encryption request contains a value stored as the LU name 7002 in the encryption setting table 3002 and a value stored as the encryption strength 7003 in association with the value of the LU name 7002. In the case where the encryption setting table 3002 has no LU registered at this point, the CPU 1102 does not need to send an encryption request.

Receiving the encryption request from the management computer 1100, the CPU 1403 of the storage subsystem 1400 encrypts the designated LU (Step 9006). Specifically, the CPU 1403 sets the value of the encryption strength 7003 contained in the encryption request to the encryption flag 8003 in an entry of the storage subsystem setting table 4004 for the LU designated by the encryption request. A value stored as the encryption flag 8003 indicates whether to encrypt data that is to be stored in an LU and the encryption strength applied. In the case where the designated LU already stores data at the time Step 9006 is executed, the CPU 1403 may read the data to encrypt and then store the data back in the designated LU. This encryption is accomplished by the CPU 1403 by running the encryption program 4002.

After that, the CPU 1002 of the search computer 1000 executes the file management program 2001 to send a file obtaining request to the storage subsystem 1400 (Step 9007). A file obtaining request is a request issued when the search computer 1000 needs to obtain a file stored in the storage subsystem 1400.

The CPU 1403 of the storage subsystem 1400 sends the requested file to the search computer 1000 (Step 9008).

The CPU 1002 of the search computer 1000 receives the file from the storage subsystem 1400 by running the file management program 2001, and creates an index of the obtained file (Step 9009). Specifically, the CPU 1002 executes the index creating program 2003 to create an index of the obtained file, and sends a request to the storage subsystem 1400 to write the created index. In sending the request, the CPU 1002 refers to the search computer setting table 2005 to obtain a value stored as the index location 5005 in association with the LU that stores the obtained file. The CPU 1002 then sends an index write request with the obtained value of the index location 5005 designated as where the index is to be written.

Receiving the write request from the search computer 1000, the CPU 1403 of the storage subsystem 1400 stores the index requested to be written in the LU designated in the write request as where the index is to be written (Step 9010). In storing the index, the CPU 1403 refers to the storage subsystem setting table 4004 to judge whether to encrypt the index. Specifically, the CPU 1403 encrypts the index when a value stored as the encryption flag 8003 in association with the LU designated as where the index is to be written is not "OFF". In the case where it is the bit count of an encryption key that is stored as the encryption flag 8003, the CPU 1403 encrypts the index with an encryption key having that bit count.

The index encryption in Step 9010 is accomplished by the CPU 1403 by running the encryption program 4002, and the storing of the index in Step 9010 is accomplished by the CPU 1403 by running the data processing program 4001.

The processing described above with reference to FIG. 9 is executed by the CPU 1403 of the storage subsystem 1400, the CPU 1002 of the search computer 1000, and the CPU 1102 of the management computer 1100, but may instead be executed by an arbitrary CPU.

For instance, Steps 9003 to 9009 may be executed by a single CPU (e.g., the CPU of one computer or the CPU 1403 of the storage subsystem 1400). A memory connected to the CPU that executes Steps 9003 to 9009 stores at least all the programs and tables shown in FIGS. 2 and 3.

Data to be stored in an LU may be encrypted by the CPU of one of the computers (e.g., the CPU 1002 of the search computer 1000) instead of the CPU 1403 of the storage subsystem 1400. The configuration and processing in this case will be described later with reference to FIGS. 10 and 11.

FIG. 9 shows an example in which Steps 9001 to 9006 are executed before Step 9007. Alternatively, Steps 9001 to 9006 may be executed after Step 9009. When Steps 9001 to 9006 are put after Step 9009, there may be cases where the LU that is about to be encrypted already stores an index at the time Step 9006 is executed. Then the CPU 1403 of the storage subsystem 1400 needs to read the index already stored in the LU, encrypt the read index, and store the encrypted index back in the LU after Step 9006 is executed.

LUs are encrypted by the storage subsystem 1400 in the encryption processing shown in FIG. 9 according to the first embodiment of this invention, but may be encrypted by the search computer 1000.

Figure 10:
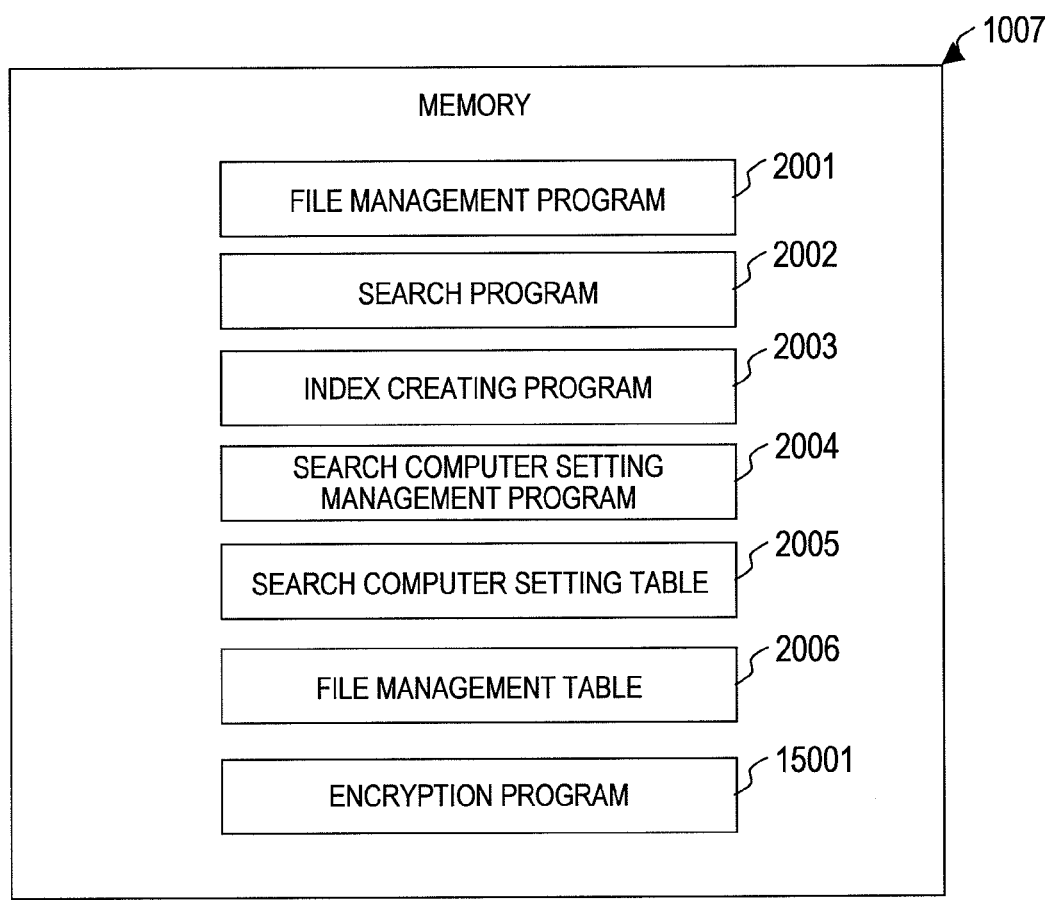
FIG. 10 is a block diagram showing a configuration of a memory of a search computer in accordance with a modification example of the first embodiment of this invention.

FIG. 10 shows the configuration of the memory 1007 of the search computer 1000 according to a modification example of the first embodiment of this invention.

The memory 1007 of the search computer 1000 that is shown in FIG. 10 is a modification example of the memory 1007 of the search computer 1000 that is shown in FIG. 2 according to the first embodiment of this invention, and stores an additional program: an encryption program 15001. Other than the encryption program 15001, the memory 1007 shown in FIG. 10 stores the same programs and tables as the memory 1007 shown in FIG. 2. Descriptions on the programs and tables common to FIGS. 2 and 10 will therefore be omitted here. The search computer 1000 can be built either when the memory 1007 of FIG. 1 is used or when the memory 1007 of FIG. 10 is used.

The encryption program 15001 encrypts an LU. Specifically, the encryption program 15001 encrypts data stored in the LU.

The memory 1404 of the storage subsystem 1400 in this modification example does not need to store the encryption program 4002.

Figure 11:
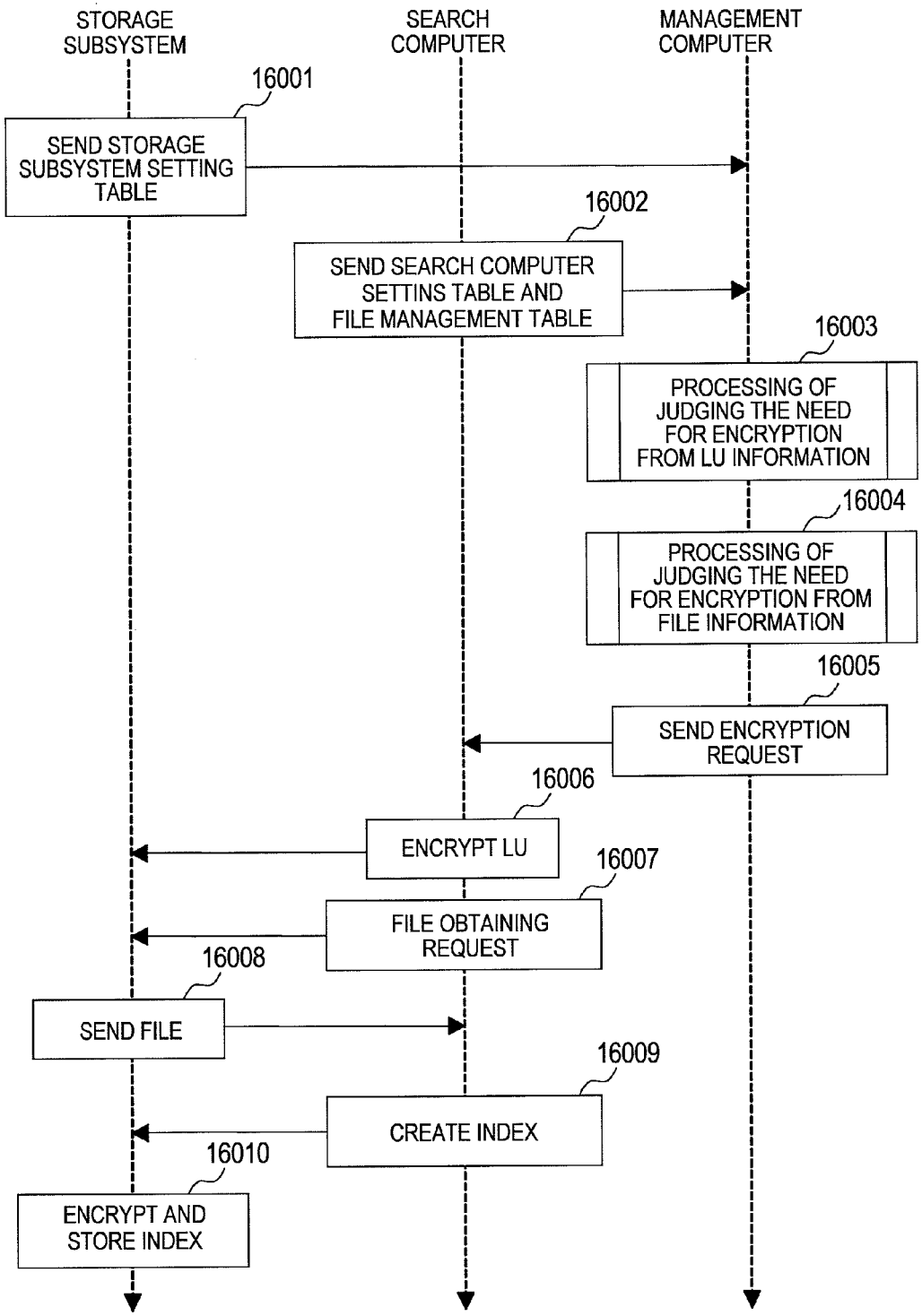
FIG. 11 is a sequence diagram showing an encryption processing in accordance with a modification example of the first embodiment of this invention.

FIG. 11 is a sequence diagram showing a modification example of the encryption processing according to the first embodiment of this invention.

Step 16001 to Step 16004 of FIG. 11 correspond to Step 9001 to Step 9004 of FIG. 9, and Step 16007 to Step 16009 of FIG. 11 correspond to Step 9007 to Step 9009 of FIG. 9. Descriptions on Steps 16001 to 16004 and Steps 16007 to 16009 will therefore be omitted here.

In Step 16005, the CPU 1102 of the management computer 1100 sends to the search computer 1000 an encryption request which designates an LU registered in the encryption setting table 3002 (Step 16005). The encryption request sent in this step is the same as the one sent in Step 9005 of FIG. 9.

The CPU 1002 of the search computer 1000 receives the encryption request from the management computer 1100 and encrypts the designated LU (Step 16006). Specifically, the CPU 1002 holds information indicating that the designated LU is to be encrypted and, based on the information, encrypts data that is to be stored in the designated LU.

As the information, a copy of the storage subsystem setting table 4004, for example, may be stored in the memory 1007 of the search computer 1000. The CPU 1002 in this case sets, upon reception of the encryption request, a value contained in the encryption request to the encryption flag 8003 as the CPU 1403 does in Step 9006 of FIG. 9.

After that, the CPU 1002 of the search computer 1000 sends a file obtaining request to the storage subsystem 1400 (Step 16007). Receiving the file obtaining request, the CPU 1403 of the storage subsystem 1400 sends the requested file to the search computer 1000 (Step 16008). Steps 16007 and 16008 are the same as Steps 9007 and 9008 of FIG. 9, respectively.

The CPU 1002 of the search computer 1000 receives the file from the storage subsystem 1400, and creates and sends an index of the obtained file (Step 16009). Specifically, the CPU 1002 creates an index of the obtained file by running the index creating program 2003. In creating the index, the CPU 1002 refers to the search computer setting table 2005 to obtain a value stored as the index location 5005 in association with the LU that stores the obtained file.

The CPU 1002 also judges from the copy of the storage subsystem setting table 4004 whether or not an LU indicated by the obtained index location 5005 has been encrypted. Specifically, the CPU 1002 judges that the LU indicated by the obtained index location 5005 has been encrypted when a value stored as the encryption flag 8003 in association with the LU name 8002 that matches the obtained index location 5005 is not "OFF". Then the CPU 1002 executes the encryption program 15001 to encrypt the created index with an encryption key having a bit count that is indicated by the encryption flag 8003.

In Step 16009, the CPU 1002 sends to the storage subsystem 1400 a request to write the created index (in the case where the created index has been encrypted, a request to write the encrypted index). This request designates the value of the obtained index location 5005 as where the index is to be written.

Receiving the write request from the search computer 1000, the CPU 1403 of the storage subsystem 1400 stores the index requested to be written in the LU designated in the write request as where the index is to be written (Step 16010).

In this manner, when the storage subsystem 1400 does not have a function of encrypting data, the processing of encrypting an LU can be executed by adding the encryption program 15001 to the memory 1007 of the search computer 1000.

Figure 12:
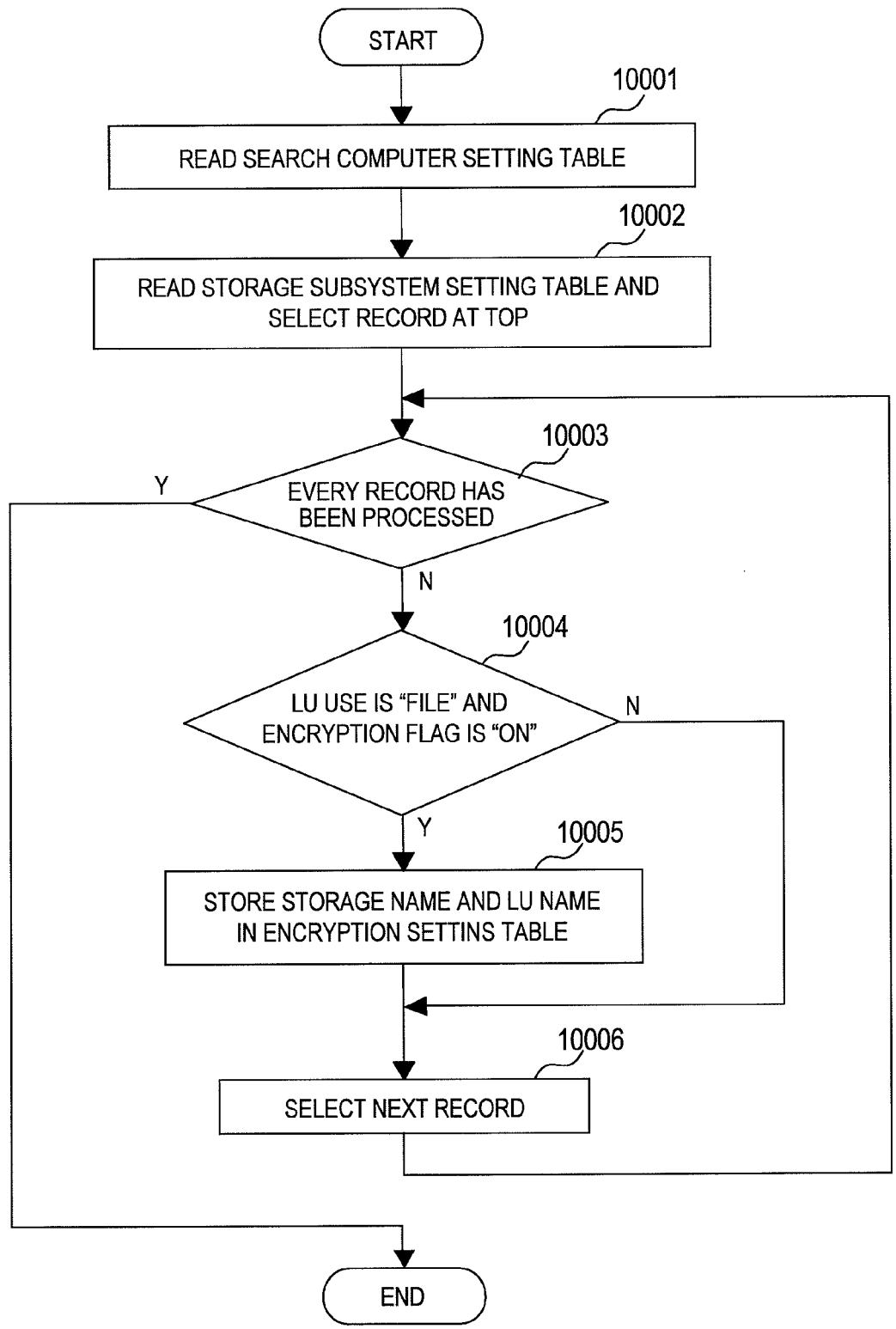
FIG. 12 is a flow chart of the processing of judging the need for encryption from LU information in accordance with the first embodiment of this invention.

FIG. 12 is a flow chart of the processing of judging the need for encryption from LU information according to the first embodiment of this invention.

The encryption judging processing shown in FIG. 12 is executed by the CPU 1102 of the management computer 1100 by running the encryption judging program 3001.

First, the CPU 1102 reads the search computer setting table 2005 received from the search computer 1000 (Step 10001).

Next, the CPU 1102 reads the storage subsystem setting table 4004 received from the storage subsystem 1400, and chooses a record at the top of this table (the top row of the storage subsystem setting table 4004 shown in FIG. 8; one record corresponds to one row) (Step 10002). In the following description of FIG. 12, an LU identified by the LU name 8002 of a chosen record of the storage subsystem setting table 4004 will be referred to as "chosen LU".

The CPU 1102 next judges whether or not every record of the storage subsystem setting table 4004 has been processed, in other words, whether or not every record of the storage subsystem setting table 4004 has been chosen and received processing of Steps 10004 to 10006 (Step 10003). When every record has finished being processed, the CPU 1102 ends the processing shown in FIG. 12. When at least one record is not processed yet, the CPU 1102 moves to Step 10004.

The CPU 1102 then searches the search computer setting table 2005 for a record whose employed LU 5002 matches the LU name 8002 of the chosen record of the storage subsystem setting table 4004. The CPU 1102 judges whether or not the LU use 5003 of the found record is "file" and the encryption flag 8003 of the chosen record is "ON" (Step 10004). In this step, the value of the encryption flag 8003 is judged as "ON" when the encryption flag 8003 has any other values than "OFF" (e.g., 128, 256, or other values indicating the encryption strength).

When the LU use 5003 is "file" and the encryption flag 8003 is "ON", it means that the chosen LU stores an encrypted file. In this case, an index created from a file in the chosen LU has to be encrypted, since encrypting a file in the chosen LU is not enough and information can leak from an index containing a part of data of the file unless the index is encrypted. The next step in this case is therefore Step 10005.

In the case where the LU use 5003 is not "file" (i.e., when the LU use 5003 is "index"), on the other hand, no index is created from data within the chosen LU. When the encryption flag 8003 is not "ON" (i.e., when the encryption flag 8003 is "OFF"), a file in the chosen LU is not an encrypted file. From the fact that the file in the chosen LU is not an encrypted file, it is interpreted that the file does not need to be guarded against information leaks, and there is no need to encrypt an index created from the file. Therefore, when the LU use 5003 is not "file" or when the encryption flag 8003 is not "ON", the next step is Step 10006.

To give an example, the LU use 5003 is "file" in a record of the search computer setting table 2005 of FIG. 5 that holds "1411" as the employed LU 5002, and the encryption flag 8003 is "128" in a record of the storage subsystem setting table 4004 of FIG. 8 that holds "1411" as the LU name 8002. Since the LU use 5003 is "file" and the encryption flag 8003 is "ON", the next step in this case is Step 10005.

In Step 10005, the CPU 1102 stores in the encryption setting table 3002 the storage name 8001 and encryption flag 8003 of the chosen record of the storage subsystem setting table 4004 and the value referred to in Step 10004 as the index location 5005 of the search computer setting table 2005.

For example, when the chosen record is a record of the storage subsystem setting table 4004 of FIG. 8 that holds "1411" as the LU name 8002, the storage name 8001 and the encryption flag 8003 in this record are "1400" and "128", respectively, and the values "1400" and "128" are stored as the storage name 7001 and the encryption strength 7003, respectively, in the encryption setting table 3002. In this example, a record of the search computer setting table 2005 of FIG. 5 that holds "1411" as the employed LU 5002 is referred to in Step 10004. The index location 5005 of this record is "1412" and the value "1412" is stored as the LU name 7002.

When a plurality of LUs (for example, the LU 1410 and the LU 1411) are encrypted, there are cases where the encryption strength 7003 holds a value at the time Step 10005 is executed. Also, the encrypted LUs may be encrypted at different encryption strengths from one another. In such cases, an LU that stores an index has to be encrypted at the greatest encryption strength of the ones applied to the encrypted LUs in order to make sure that information does not leak from the index.

To accomplish this, the CPU 1102 compares a value already stored as the encryption strength 7003 against a value stored as the encryption flag 8003 in the chosen record. The CPU 1102 updates the encryption strength 7003 with the value of the encryption flag 8003 of the chosen record only when the comparison shows that the value of the encryption flag 8003 of the chosen record indicates a greater encryption strength than the one indicated by the current value of the encryption strength 7003.

The CPU 1102 then newly chooses a record of the storage subsystem setting table 4004 that is immediately below the currently chosen record (Step 10006), and returns to Step 10003.

Figure 13:
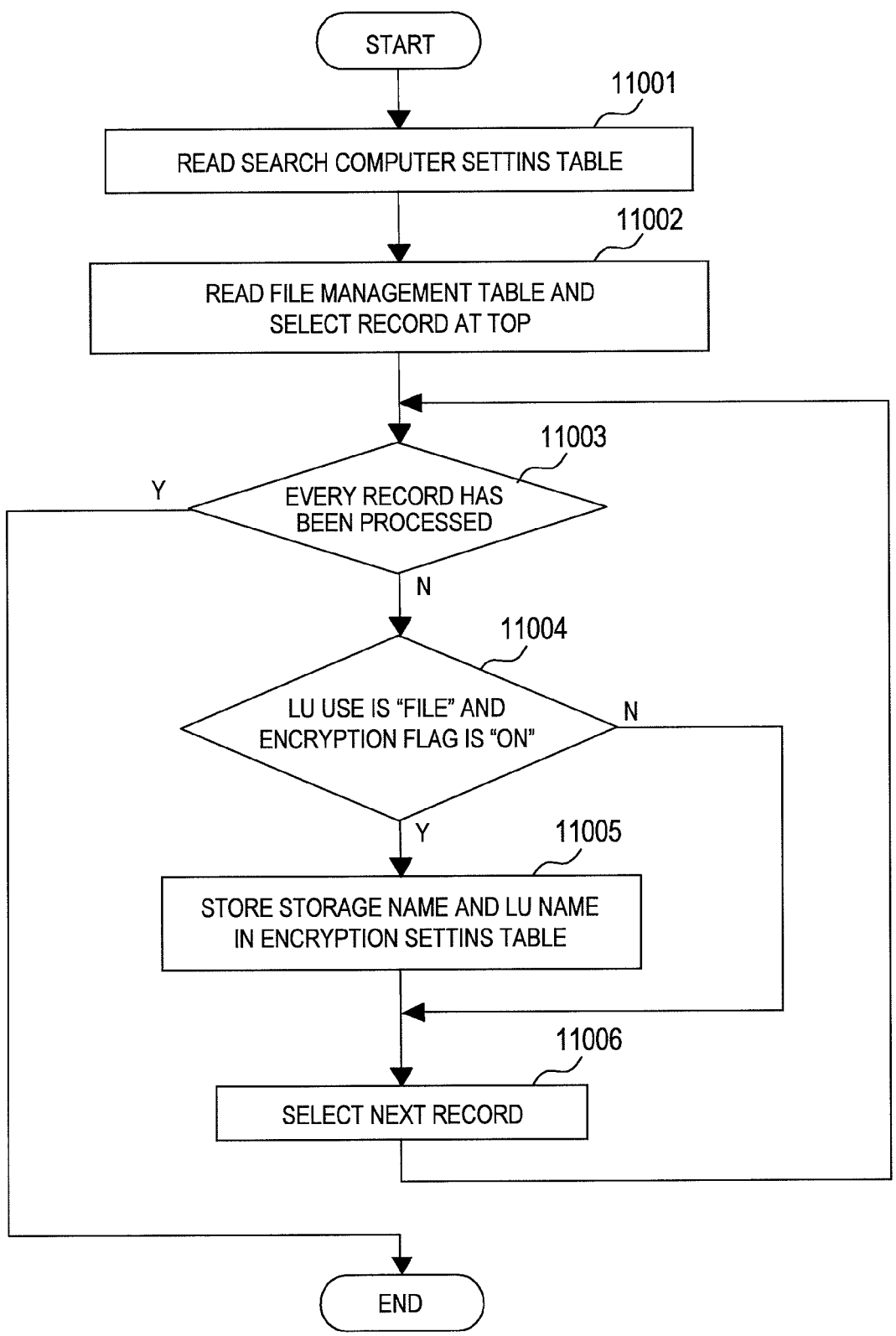
FIG. 13 is a flow chart of the processing of judging the need for encryption from file information in accordance with the first embodiment of this invention.

FIG. 13 is a flow chart of the processing of judging the need for encryption from file information according to the first embodiment of this invention.

The encryption judging processing shown in FIG. 13 is executed by the CPU 1102 of the management computer 1100 by running the encryption judging program 3001.

First, the CPU 1102 reads the search computer setting table 2005 received from the search computer 1000 (Step 11001).

Next, the CPU 1102 reads the file management table 2006 received from the search computer 1000, and chooses a record at the top of this table (Step 11002). In the following description of FIG. 13, a file identified by the file name 6001 of a chosen record of the file management table 2006 will be referred to as "chosen file", and an LU identified by the file-storing LU name 6003 of this record will be referred to as "chosen LU".

The CPU 1102 next judges whether or not every record of the file management table 2006 has been processed, in other words, whether or not every record of the file management table 2006 has been chosen and received processing of Steps 11004 to 11006 (Step 11003). When every record has finished being processed, the CPU 1102 ends the processing shown in FIG. 13. When at least one record is not processed yet, the CPU 1102 moves to Step 11004.

The CPU 1102 then searches the search computer setting table 2005 for a record whose employed LU 5002 matches the file-storing LU name 6003 of the chosen record of the file management table 2006. The CPU 1102 judges whether or not the LU use 5003 of the found record is "file" and the encryption flag 6004 of the chosen record is "ON" (Step 11004). In this step, the value of the encryption flag 6004 is judged as "ON" when the encryption flag 6004 has any other values than "OFF" (e.g., 128, 256, or other values indicating the encryption strength).

When the LU use 5003 is "file" and the encryption flag 6004 is "ON", it means that the chosen file is an encrypted file. Then an index created from the chosen file has to be encrypted in order to avoid information leaks. The next step in this case is therefore Step 11005.

In the case where the LU use 5003 is not "file" (i.e., when the LU use 5003 is "index"), on the other hand, no index is created from data within the chosen LU. When the encryption flag 6004 is not "ON" (i.e., when the encryption flag 6004 is "OFF"), because a file in the chosen LU is not an encrypted file, there is no need to encrypt an index created from the file. Therefore, when the LU use 5003 is not "file" or when the encryption flag 6004 is not "ON", the next step is Step 11006.

To give an example, the LU use 5003 is "file" in a record of the search computer setting table 2005 of FIG. 5 that holds "1411" as the employed LU 5002, and the encryption flag 6004 is "256" in a record of the file management table 2006 of FIG. 6 that holds "1411" as the file-storing LU name 6003. Since the LU use 5003 is "file" and the encryption flag 6004 is "ON", the next step in this case is Step 11005.

In Step 11005, the CPU 1102 stores the file-storing storage name 6002 and encryption flag 6004 of the chosen record of the file management table 2006 and the value referred to in Step 11004 as the index location 5005 of the search computer setting table 2005 in the encryption setting table 3002.

For example, when the chosen record is a record of the file management table 2006 of FIG. 6 that holds "1411" as the file-storing LU name, the file-storing storage name 6002 and the encryption flag 6004 in this record are "1400" and "256", respectively, and the values "1400" and "256" are stored as the storage name 7001 and the encryption strength 7003, respectively, in the encryption setting table 3002. In this example, a record of the search computer setting table 2005 of FIG. 5 that holds "1411" as the employed LU 5002 is referred to in Step 11004. The index location 5005 of this record is "1412" and the value "1412" is stored as the LU name 7002.

In some cases, the encryption strength 7003 already has a value at the time Step 11005 is executed. These are cases where a value has been set to the encryption strength 7003 through the processing of FIG. 12, or cases where a plurality of files (for example, the File 1413 and the File 1414) are encrypted. Also, the value set to the encryption strength 7003 through the processing of FIG. 12 may differ from the encryption strength at which the file is encrypted, or the encrypted files may be encrypted at different encryption strengths from one another. In such cases, an LU that stores an index has to be encrypted at the greatest encryption strength of the one set to the encryption strength 7003 through the processing of FIG. 12 and the ones applied to the encrypted files in order to make sure that information does not leak from the index.

To accomplish this, the CPU 1102 compares a value already set to the encryption strength 7003 against a value stored as the encryption flag 6004 in the chosen record. The CPU 1102 updates the encryption strength 7003 with the value of the encryption flag 6004 of the chosen record only when the comparison shows that the value of the encryption flag 6004 of the chosen record indicates a greater encryption strength than the one indicated by the current value of the encryption strength 7003.

For example, immediately after the processing of judging the need for encryption from LU information is executed as shown in FIG. 12, a record of the encryption setting table 3002 that holds "1412" as the LU name 7002 has a value "128" as the encryption strength 7003 (see Step 10005). After the processing of judging the need for encryption from file information is executed as shown in FIG. 13, "256" is stored as the encryption strength 7003 since "256" is a greater encryption strength than "128".

The CPU 1102 then newly chooses a record of the file management table 2006 that is immediately below the currently chosen record (Step 11006), and returns to Step 11003.

As has been described, according to the first embodiment of this invention, whether a file is an encrypted file or not is judged in creating an index that is used to search for the file. In the case where the file is an encrypted file, the created index is also encrypted before stored in an LU. The risk of a leak of confidential information is thus lowered.

Encrypting every index created prolongs the time required to encrypt and decrypt the entire volume in creating an index and retrieving a file, and accordingly slows down index creation and file retrieval. In the first embodiment of this invention, an index created from a file is not encrypted when the file is not an encrypted file. The first embodiment of this invention thus skips unnecessary encryption, thereby avoiding a drop in processing speed as a result of executing encryption and a drop in search processing speed as a result of executing decryption.

Second Embodiment

In a second embodiment of this invention, index judging processing is executed when the search computer 1000 creates an index of a file stored in the storage subsystem 1400. Descriptions on components and processing of the second embodiment which are common to the first embodiment will be omitted here.

The configuration of a computer system according to the second embodiment of this invention is as shown in FIG. 1. Unlike the first embodiment, the LU 1412 of the second embodiment stores the Index 1416 in addition to the Index 1415. The Index 1415 and the Index 1416 store indices created from files that store user data (e.g., the File 1413 and the File 1414). In the second embodiment, the Index 1415 is an index-storing file that is not encrypted whereas the Index 1416 is an index-storing file that is encrypted.

Figure 14:
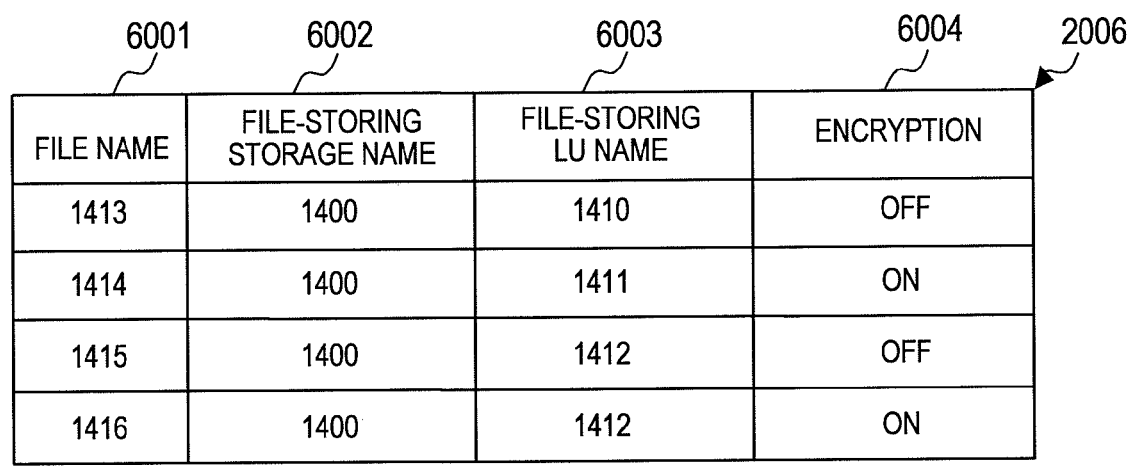
FIG. 14 is an explanatory diagram showing a configuration of file management table in accordance with a second embodiment of this invention.

FIG. 14 shows the configuration of the file management table 2006 according to the second embodiment of this invention.

The file management table 2006 of the second embodiment is the same as the file management table 2006 of the first embodiment which is shown in FIG. 6, except for an additional record for the Index 1416 in the fourth row.

In the example of FIG. 14, "1416", "1400", "1412", and "128" are stored as the file name 6001, the file-storing storage name 6002, the file-storing LU name 6003, and the encryption flag 6004, respectively, in the fourth row of the file management table 2006. This means that the Index 1416 stored in the LU 1412 of the storage subsystem 1400 has been encrypted by a host computer that has created the Index 1416, and that a key used in encrypting the Index 1416 has a length of 128 bits.

Figure 15:
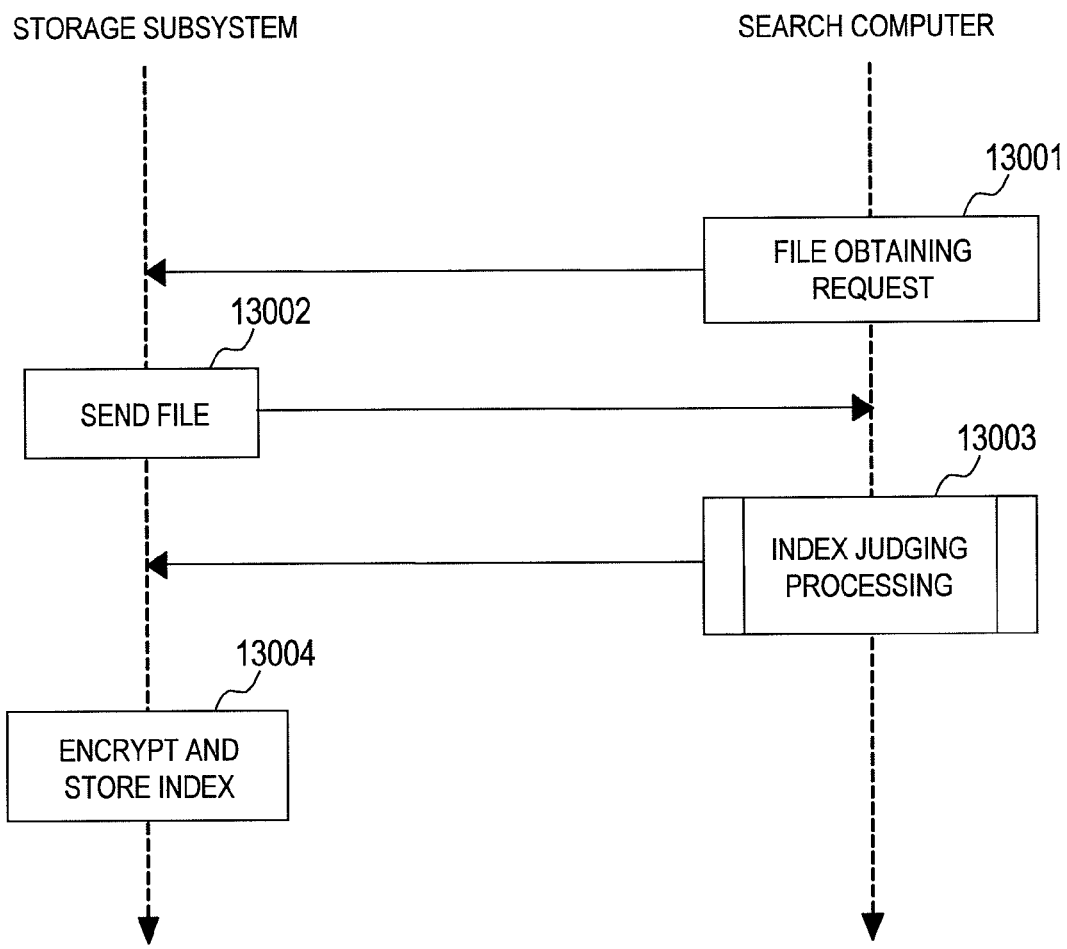
FIG. 15 is a sequence diagram showing an encryption processing in accordance with the second embodiment of this invention.

FIG. 15 is a sequence diagram of encryption processing according to the second embodiment of this invention.

The transmission of a file obtaining request (Step 13001) and the transmission of a file (Step 13002) are the same as Step 9007 and Step 9008 of FIG. 9, respectively, and descriptions on these steps are omitted here.

Receiving the file from the storage subsystem 1400, the CPU 1002 of the search computer 1000 executes the index judging processing (Step 13003) to create an index. Details of the index judging processing will be described later with reference to FIG. 16. The CPU 1002 then sends a request to the storage subsystem 1400 to write the index created through the index judging processing. This write request contains the created index and information indicating a storage area where the index is to be stored (specifically, a storage area associated with the Index 1415 or Index 1416).

The storage subsystem 1400 receives the write request and stores the index requested to be written in the storage area designated by the write request (Step 13004).

Figure 16:
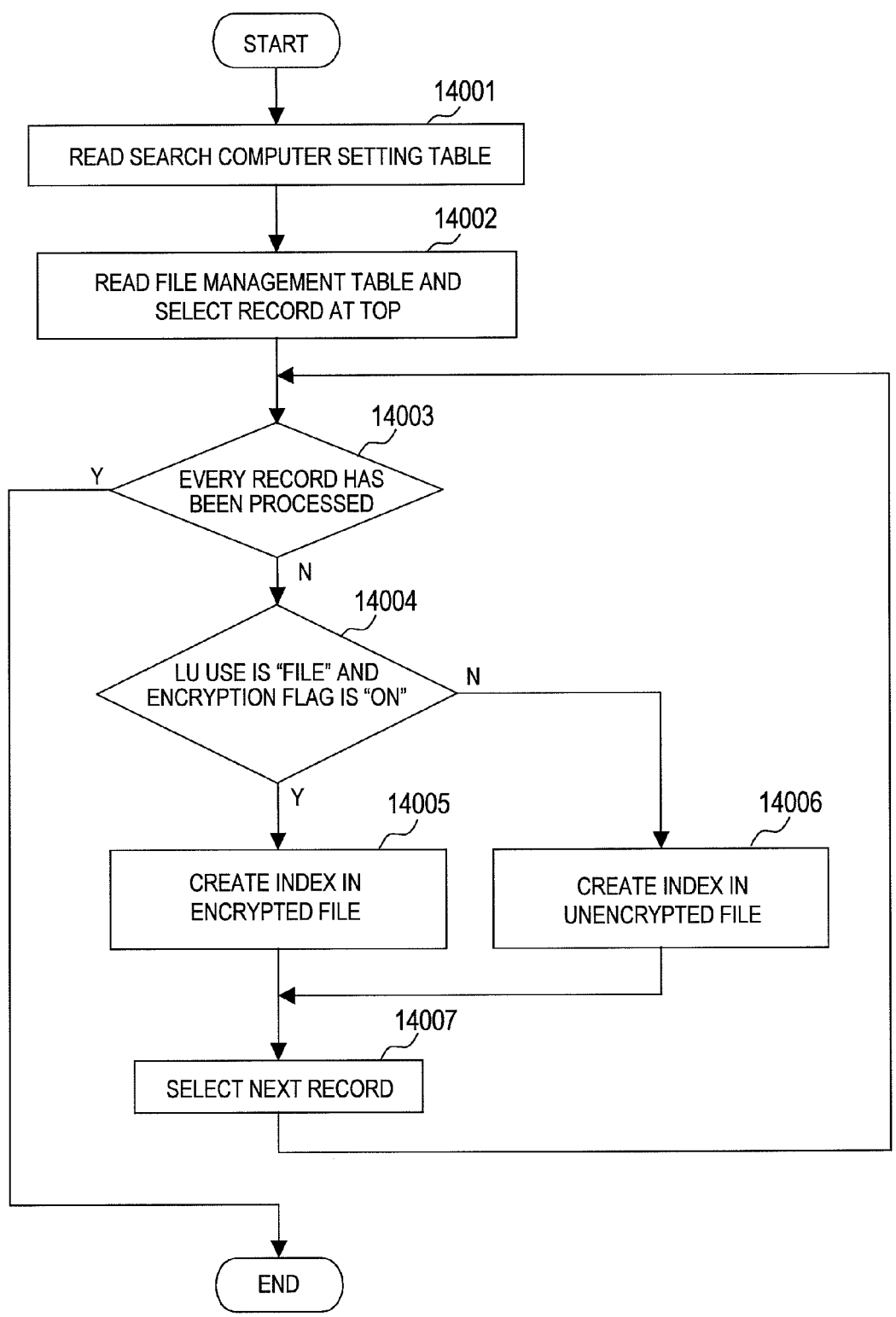
FIG. 16 is a flow chart of the index judging processing in accordance with the second embodiment of this invention.

FIG. 16 is a flow chart of the index judging processing according to the second embodiment of this invention.

The index judging processing shown in FIG. 16 is executed by the CPU 1002 of the search computer 1000 by running the index creating program 2003.

First, the CPU 1002 reads the search computer setting table 2005 (Step 14001).

Next, the CPU 1002 reads the file management table 2006 and chooses a record at the top of this table (Step 14002). In the following description of FIG. 16, a file identified by the file name 6001 of a chosen record of the file management table 2006 will be referred to as "chosen file", and an LU identified by the file-storing LU name 6003 of this record will be referred to as "chosen LU".

The CPU 1002 next judges whether or not every record of the file management table 2006 has been processed, in other words, whether or not every record of the file management table 2006 has been chosen and received processing of Steps 14004 to 14007 (Step 14003). When every record has finished being processed, the CPU 1002 ends the processing shown in FIG. 16. When at least one record is not processed yet, the CPU 1102 moves to Step 14004.

The CPU 1002 then searches the search computer setting table 2005 for a record whose employed LU 5002 matches the file-storing LU name 6003 of the chosen record of the file management table 2006. The CPU 1002 judges whether or not the LU use 5003 of the found record is "file" and the encryption flag 6004 of the chosen record is "ON" (Step 14004).

When the LU use 5003 is "file" and the encryption flag 6004 is "ON", it means that the chosen file is an encrypted file. Then an index created from the chosen file has to be encrypted in order to avoid information leaks. The next step in this case is therefore Step 14005.

In the case where the LU use 5003 is not "file" (i.e., when the LU use 5003 is "index"), on the other hand, no index is created from data within the chosen LU. When the encryption flag 6004 is not "ON" (i.e., when the encryption flag 6004 is "OFF"), because a file in the chosen LU is not an encrypted file, there is no need to encrypt an index created from the file. Therefore, when the LU use 5003 is not "file" or when the encryption flag 6004 is not "ON", the next step is Step 14006.

To give an example, the LU use 5003 is "file" in a record of the search computer setting table 2005 of FIG. 5 that holds "1411" as the employed LU 5002, and the encryption flag 6004 is "256" in a record of the file management table 2006 of FIG. 14 that holds "1411" as the file-storing LU name 6003. Since the LU use 5003 is "file" and the encryption flag 6004 is "ON", the next step in this case is Step 14005.

In Step 14005, the CPU 1002 creates an index of the chosen file in an index-storing file that is encrypted (the Index 1416 of FIG. 1). Specifically, the CPU 1002 creates an index for searching for the chosen file based on the chosen file, and encrypts the created index. The CPU 1002 sends a request to the storage subsystem 1400 to write the encrypted index in the Index 1416.

To execute the encryption in Step 14005, the index creating program 2003 needs to have a function of encrypting data. Alternatively, another program that has a data encrypting function may be called up in Step 14005.

In Step 14006, the CPU 1002 creates an index of the chosen file in an index-storing file that is not encrypted (the Index 1415 of FIG. 1). Specifically, the CPU 1002 creates an index for searching for the chosen file based on the chosen file, and sends a request to the storage subsystem 1400 to write the created index in the Index 1415.

The CPU 1102 then newly chooses a record of the file management table 2006 that is immediately below the currently chosen record (Step 14007), and returns to Step 14003.

The index judging processing, which, in FIG. 16, is executed on a file basis to process one file stored in an LU at a time, may be executed on an LU basis. Specifically, which index-storing file is to store indices of all files in one LU is determined based on information of the LU.

In this case, the CPU 1002 reads the storage subsystem setting table 4004 in Step 14002 of FIG. 16. The search computer 1000 receives the storage subsystem setting table 4004 from the storage subsystem 1400 in advance in order to read the storage subsystem setting table 4004 in Step 14002.

In Step 14004 of FIG. 16, the CPU 1002 searches the search computer setting table 2005 for a record whose employed LU 5002 matches the LU name 8002 of the chosen record of the storage subsystem setting table 4004. The CPU 1002 judges whether or not the LU use 5003 of the found record is "file" and the encryption flag 8003 of the chosen record is "ON".

When the LU use 5003 is "file" and the encryption flag 8003 is "ON", the next step is Step 14005. When the LU use 5003 is not "file" or when the encryption flag 8003 is not "ON", the next step is Step 14006.

In Step 14005, the CPU 1002 creates an index of a file stored in an LU that is identified by the LU name 8002 of the chosen record in an index-storing file that is encrypted (the Index 1416 of FIG. 1). Specifically, the CPU 1002 creates an index of a file stored in an LU that is identified by the LU name 8002 of the chosen record, encrypts the created index, and stores the encrypted index in the Index 1416.

In Step 14006, the CPU 1002 creates an index of a file stored in an LU that is identified by the LU name 8002 of the chosen record in an index-storing file that is not encrypted (the Index 1415 of FIG. 1). Specifically, the CPU 1002 creates an index of a file stored in an LU that is identified by the LU name 8002 of the chosen record, and stores the created index in the Index 1415.

As has been described, according to the second embodiment of this invention, an encrypted index of a file is created in an index-storing file that is encrypted. The risk of a leak of confidential information is thus lowered. The second embodiment of this invention also skips encryption of an index that does not need encryption by creating an unencrypted index of a file in an index-storing file that is not encrypted. The delay in index creation and file retrieval due to encryption is thus minimized.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a computer;
a storage subsystem coupled to the computer; and
a network through which the computer and the storage subsystem are coupled,
wherein the computer comprises an interface coupled to the network, a first hardware processor coupled to the interface, and a memory coupled to the first hardware processor,
wherein the storage subsystem comprises a disk device to store data, and a second hardware processor to control the disk device,
wherein a storage area of the disk device is divided into a plurality of storage areas including, at least, a first storage area and a second storage area, and
wherein the first hardware processor is configured to:
read a part or parts of data stored in the first storage area to create an index for the data stored in the first storage area;
judge whether or not the data stored in the first storage area is confidential data;
encrypt the part or parts of the data when it is judged that the data stored in the first storage are is confidential data; and
write the encrypted part or parts of the data into the second storage area;
wherein the plurality of storage areas further include a third storage area,
wherein the first hardware processor reads a part of or parts of data stored in the third storage area, and
wherein, when it is judged that the data stored in the first storage area is confidential data, the first hardware processor to encrypt the part or parts of the data read from the third storage area, and to write the encrypted part or parts of the data read from the third storage area into the second storage area.

2. The computer system according to claim 1,
wherein, when the data stored in the first storage area and the data stored in the third storage area are both confidential data, the first hardware processor to compare encryption strength that has been employed to encrypt the data stored in the first storage area against encryption strength that has been employed to encrypt the data stored in the third storage area, and
wherein, when the encryption strength employed for the data stored in the first storage area is greater than the encryption strength employed for the data stored in the third storage area, the first hardware processor to encrypt the part or parts of data read from the third storage area at encryption strength equal to the one employed for the data stored in the first storage area.

3. The computer system according to claim 2,
wherein, when an encryption key that has been used to encrypt the data stored in the first storage area is longer than an encryption key that has been used to encrypt the data stored in the third storage area, the first hardware processor to judge that the encryption strength employed for the data stored in the first storage area is greater than the encryption strength employed for the data stored in the third storage area, and
wherein, when it is judged that the encryption strength employed for the data stored in the first storage area is greater than the encryption strength employed for the data stored in the third storage area, the first hardware processor further to encrypt the part or parts of data read from the third storage area with an encryption key that has the same length as the one used to encrypt the data stored in the first storage area.

4. The computer system according to claim 1, wherein the first storage area, the second storage area, and the third storage area are each a logical volume managed by the storage subsystem.

5. The computer system according to claim 1,
wherein the second storage area is a logical volume managed by the storage subsystem,
wherein the first storage area is a storage area that stores data of a first file which is written by the computer coupled to the network, and
wherein the third storage area is a storage area that stores data of a second file which is written by the computer coupled to the network.

6. The computer system according to claim 2,
wherein the memory to store information that indicates, for each of the storage areas, whether or not data stored in the storage area is confidential data and information that indicates encryption strength employed when the data stored in the storage area is confidential data, and
wherein the first hardware processor to judge for each storage area, based on the information stored in the memory, whether or not data stored in the storage area is confidential data and what encryption strength has been employed.

7. The computer system according to claim 1,
wherein the plurality of storage areas further include a fourth storage area, and
wherein, when it is judged that the data stored in the first storage area is not confidential data, the first hardware processor to write the part or parts of data read form the third storage area into the fourth storage area without encrypting the part or parts of data read from the third storage area.

8. The computer system according to claim 7,
wherein the plurality of storage areas further include a fifth storage area,
wherein the first hardware processor to read a part or parts of data stored in the fifth storage area,
wherein, when the data stored in the first storage area and the data stored in the fifth storage area are both confidential data, the first hardware processor to compare encryption strength that has been employed to encrypt the data stored in the first storage area against encryption strength that has been employed to encrypt the data stored in the fifth storage area, and
wherein, when the encryption strength employed for the data stored in the first storage area is greater than the encryption strength employed for the data stored in the fifth storage area, the first hardware processor to encrypt the part or parts of data read form the fifth storage area at encryption strength equal to the one employed for the data stored in the first storage area and further to write the encrypted part or parts of data read from the fifth storage area into the second storage area.

9. The computer system according to claim 7,
wherein the second storage area is a storage area that stores data of a third file, which is written by the computer connected to the network, and
wherein the fourth storage area is a storage area that stores data of a fourth file, which is written by the computer connected to the network.

10. A security management method for controlling a computer system, the computer system having a computer, a storage subsystem connected to the computer, and a network through which the computer and the storage subsystem are coupled, the computer having an interface coupled to the network, a first hardware processor coupled to the interface, and a memory coupled to the first hardware processor, the storage subsystem having a disk device which stores data, and a second hardware processor which controls the disk device, a storage area of the disk device being divided into a plurality of storage areas including, at least, a first storage area, a second storage area, and a third storage area, the security management method comprising steps of:
reading, by the first hardware processor, a part or parts of data stored in the first storage area to create an index for the data stored in the first storage area;
judging, by the first hardware processor, whether or not the data stored in the first storage area is confidential data;
encrypting, by the first hardware processor, the part or parts of data read from the first storage area when it is judged that the data stored in the first storage area is confidential data; and
writing, by the first hardware processor, the encrypted part or parts of data into the second storage area;
and the security management method further comprises:
reading, by the first hardware processor, a part or parts of data stored in the third storage area;
encrypting, by the first hardware processor, when it is judged that the data stored in the first storage area is confidential data, the part or pats of data read from the third storage area; and
writing, by the first hardware processor, the encrypted part or parts of data read from the third storage into the second storage area.

11. The security management method according to claim 10, further comprising steps of:
comparing, by the first hardware processor encryption strength that has been employed to encrypt the data stored in the first storage area against encryption strength that has been employed to encrypt the data stored in the third storage area when the data stored in the first storage area and the data stored in the third storage area are both confidential data, and
encrypting, by the first hardware processor the part or parts of data read from the third storage area at encryption strength equal to the one employed for the data stored in the first storage area when the encryption strength employed for the data stored in the first storage area is greater than the encryption strength employed for the data stored in the third storage area.

12. The security management method according to claim 11,
wherein the step of comparing includes judging that the encryption strength employed for the data stored in the first storage area is greater than the encryption strength employed for the data stored in the third storage area when an encryption key that has been used to encrypt the data stored in the first storage area is longer than an encryption key that has been used to encrypt the data stored in the third storage area, and wherein the step of encrypting the part or parts of data read from the third storage area includes encrypting with an encryption key that has the same length as the one used to encrypt the data stored in the first storage area when it is judged that the encryption strength employed for the data stored in the first storage area is greater than the encryption strength employed for the data stored in the third storage area.

13. The security management method according to claim 10, wherein the first storage area, the second storage area, and the third storage area are each a logical volume managed by the storage subsystem.

14. The security management method according to claim 10, wherein the second storage area is a logical volume managed by the storage subsystem, wherein the first storage area is a storage area that stores data of a first file which is written by the computer coupled to the network, and wherein the third storage area is a storage area that stores data of a second file which is written by the computer coupled to the network.

15. The security management method according to claim 11, wherein the memory of the computer system stores information that indicates, for each of the storage areas, whether or not data stored in the storage area is confidential data and information that indicates encryption strength employed when the data stored in the storage area is confidential data, the security management method further comprises a step of judging for each storage area, based on the information stored in the memory, whether or not data stored in the storage area is confidential data and what encryption strength has been employed.

16. A security management method according to claim 10, wherein the plurality of storage areas further include a fourth storage area, the security management method further comprises steps of:

and writing, when it is judged that the data stored in the first storage area is not confidential data, the part or parts of data read from the third storage area into the fourth storage area without encrypting the read part or parts of data.

17. The security management method according to claim 16, wherein the plurality of storage areas of the computer system further include a fifth storage area, the security management method further comprises steps of:

reading, by the first hardware processor a part or parts of data stored in the fifth storage area;

comparing, by the first hardware processor encryption strength that has been employed to encrypt the data stored in the first storage area against encryption strength that has been employed to encrypt the data stored in the fifth storage area when the data stored in the first storage area and the data stored in the fifth storage area are both confidential data; and encrypting, by the first hardware processor the part or parts of data read from the fifth storage area at encryption strength equal to the one employed for the data stored into the first storage area and writing the encrypted part or parts of data read from the fifth storage area into the second storage area when the encryption strength employed for the data stored in the first storage area is greater than the encryption strength employed for the data stored in the fifth storage area.

18. The security management method according to claim 16, wherein the second storage area is a storage area that stores data of a third file, which is written by the computer connected to the network, and wherein the fourth storage area is a storage area that stores data of a fourth file, which is written by the computer connected to the network.

* * * * *